United States Patent [19]

Brown

[11] Patent Number: 5,048,231

[45] Date of Patent: Sep. 17, 1991

[54] PLANT SUPPORT CONSTRUCTED FOR COMPACT NESTING

[76] Inventor: Dwight C. Brown, 1516 N. Nicholas St., Arlington, Va. 22205

[21] Appl. No.: 561,469

[22] Filed: Aug. 1, 1990

[51] Int. Cl.$^5$ .............................................. A01G 17/06
[52] U.S. Cl. .......................................... 47/45; 52/653; 47/47
[58] Field of Search .................. 47/44, 45, 47; 52/653

[56] References Cited

U.S. PATENT DOCUMENTS

| | | |
|---|---|---|
| 374,906 | 12/1887 | Rovane . |
| 587,581 | 8/1897 | Horan ..................... 47/47 |
| 760,879 | 5/1904 | Kunzman . |
| 1,018,157 | 2/1912 | Black, Jr. ................. 47/45 |
| 1,053,146 | 2/1913 | Becvar ..................... 47/45 |
| 1,218,115 | 3/1917 | Phillips . |
| 1,361,464 | 12/1920 | Hunt . |
| 1,377,832 | 5/1921 | Hanner .................... 47/47 |
| 1,617,494 | 2/1927 | Nuckols . |
| 1,868,371 | 7/1932 | Smalts .................... 47/45 |
| 2,000,632 | 5/1935 | Zingre ................... 47/45 X |
| 2,009,867 | 7/1935 | Ball ........................ 47/44 |
| 2,014,175 | 9/1935 | Hart ..................... 47/45 X |
| 3,113,400 | 12/1963 | Emond . |
| 3,264,783 | 8/1966 | Bayliss . |
| 4,285,163 | 8/1981 | Booker, Jr. . |
| 4,503,636 | 3/1985 | Stuckey .................... 47/44 |
| 4,785,576 | 11/1988 | Morgan . |

*Primary Examiner*—David A. Scherbel
*Assistant Examiner*—Linda Watson
*Attorney, Agent, or Firm*—William L. Klima

[57] ABSTRACT

A plant support for providing support to the branches of a growing plant such as a tomato plant. The plant support comprises a plurality of vertical supports connected or welded to a top horizontal support leaving a remaining open side. The open side of the plant support can be completely or partially closed by integral interconnecting structure of the plant support or by separate structure and/or flexible cord, tape, wire, netting, etc. The construction allows for little or no tapering of the vertical supports in combination with side loading of other units for nesting purposes.

20 Claims, 3 Drawing Sheets

FIG. 6
FIG. 7
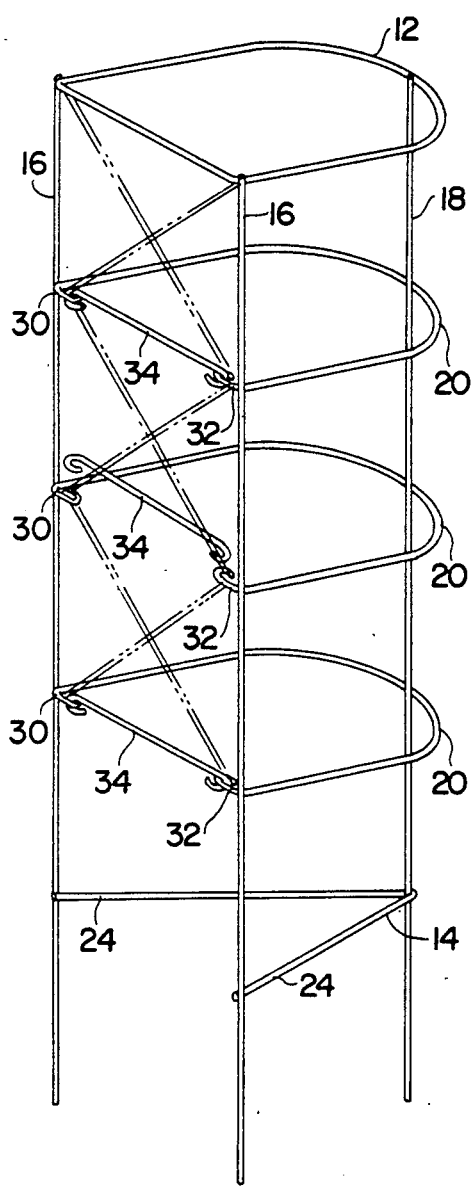
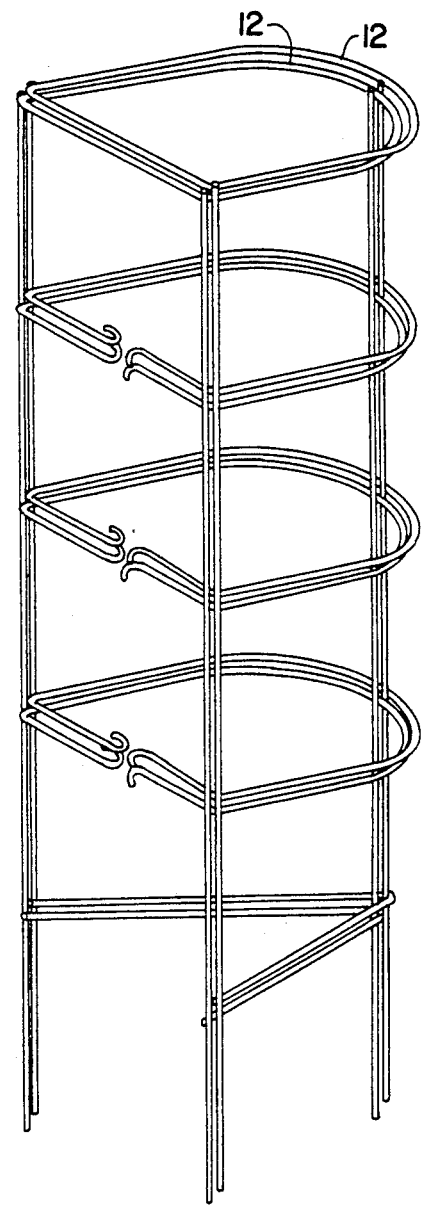

PLANT SUPPORT CONSTRUCTED FOR COMPACT NESTING

FIELD OF THE INVENTION

The present invention is directed to a plant support constructed in a manner to facilitate nesting of a plurality of similar plant supports for shipping and storage purposes. More specifically, the plant support according to the present invention is constructed with a plurality of vertical elements connected to a top horizontal element, with or without additional horizontal elements connected or attached to the vertical elements. The plant support is constructed so as to be open on one side to allow side loading of another similar plant support to facilitate nesting of the one unit within the other. The open side can be connected or partially closed or partitioned by various means before use.

BACKGROUND OF THE INVENTION

The plant support of the present invention was devised to overcome a number of problems existing with conventional plant supports. For example, the ability to nest a plurality of plant supports compactly is a important feature with respect to shipping and storage of a plurality of plant supports.

During bulk shipment of an order of plant supports by an original equipment manufacturer, it is highly desirable to reduce the overall dimensions of the bulk shipment to reduce the costs involved in shipment and to meet the dimensional limitations of common parcel shipping organizations such as United Parcel Service (UPS). United Parcel Service sets a maximum dimensional limit for shipping packages of a length and girth not exceeding 130 inches. Eight plant supports according to the present invention, each having a length of 60 inches, a depth of 16 inches and a width at the open end of 16 inches, can be nested together and pack in a carton having a combined length and girth of less than 130 inches. When one unit is nested within another unit, the length of the resulting stack is increased by the diameter of the top attached horizontal element, and the depth of the stack is increased by the diameter of the rear vertical element or elements. The width of the nested stack remains the same regardless of the number of units nested.

The ability to nest used plant supports by an end user such as a novice or professional gardener is also especially important for storage during the fall and winter off planting seasons. Typically, after the growing season, the gardener prefers a compact nesting type of support to reduce the amount of storage space needed for successful storage thereof. Some conventional plant supports suffer with respect to nesting due to the inability or difficulty of nesting used plant supports of this type. For example, popular plant supports sold on the market today comprise circular so-called "cage" supports having three (3) or four (4) tapered vertical support wires having lower free ends that together are imbedded into the ground during usage and three (3) or four (4) horizontal cross wires welded or otherwise attached to the vertical support wires. The round supports generally have vertical support wires that are extremely tapered inwardly from top to bottom to provide nesting of a multiple number of units for shipment and storage. This popular support suffers nesting difficulties due to the free ends being bent during insertion into the ground and remain bent after removal at the end of the season. These bent free ends impede or prevent successful repeated nesting of a plurality of such plant supports from year-to-year. Further, the extreme taper required for nesting does not provide good stability of the unit when inserted in the ground and the small diameter of the lower horizontal wires is generally insufficient to properly enclose and support the lower branches of the plant. Also, the frictional and interference contact of the units so nested makes it difficult to remove a unit from a nested stack of units. In contrast, the unit according to the present invention requires little or no tapering of the vertical wires of the vertical support wires, and thus provides improved stability when inserted into the ground, and more enclosure and support area for the lower branches of the plant.

Another common plant support in use today is constructed from a section of concrete reinforcement wire having a square or rectangular wire matrix construction. The plant support is formed by bending a section of the reinforcement wire into a cylinder-shape and wiring the ends together to form a finished plant support unit. At the end of the planting season, these plant supports are generally left intact and stored side-by-side as separate units, since these plant supports cannot be effectively nested. As a result, a large storage area is required for such supports.

Another consideration in the successful use and implementation of a plant support is its cost of manufacture. This is a major factor that determines the potential use and affordability of large plant growers in the farming industry as well as the home gardener. The cost of a wire type plant support unit is dictated directly by its dimensions and the number of bends and welds necessary to complete each unit. The plant support according to some embodiments of the present invention reduces the number of bends and welds necessary to complete a finished unit.

In addition, as shown in several embodiments of the present invention, the partial closing or partitioning of the remaining open area of the support by inexpensive flexible cord, string, twine and tape (particularly stretchable tape) as well as non-rigid netting, etc., used in lieu of permanently connected rigid wire horizontal elements, reduces substantially the cost of the support. Such accessories, applied by the gardener at time of use, also provides other advantages which include eliminating and reducing the damage that would otherwise occur using rigid wire horizontal elements. Such damage is caused by the growth of the plant and the wind which results in the plant branches frictionally rubbing in contact with the rigid wire horizontal elements.

Such reduced manufacturing costs and operating advantages in combination with the ability to compactly nest a plurality of plant support units renders the plant support according to the present invention superior over conventional units.

SUMMARY OF THE INVENTION

An object of the present invention is to provide an improved plant support.

Another object of the present invention is to provide an improved plant support allowing compact nesting of a plurality of the same of similar plant support units.

A further object of the present invention is to provide a plant support that allows compact nesting of a plurality of the same or similar plant support units by providing side loading of one unit within another unit with the units being nested on the open or partially open side.

Another object of the present invention is to provide a plant support that allows compact nesting of a plurality of the same or similar units constructed with a plurality of vertical supports connected to a top horizontal support, which construction is provided with an open or partially open side to allow side loading of another plant support to facilitate compact nesting of a plurality of units.

A further object of the present invention is to provide a plant support that allows compact nesting of a plurality of the same or similar units constructed with a plurality of vertical supports and a top horizontal support having an open side to allow side loading and nesting of another unit, in combination with additional structure to allow opening and closing or partial closing of the unit repeatedly or, alternatively, can be closed or partially closed with additional separate structure and/or flexible cord, wire, twine, tape, and also netting or large mesh non-rigid material, which can be attached to the basic support by the user at the time of use.

BRIEF DESCRIPTION OF THE DRAWINGS

FIG. 6 is another embodiment of the plant support according to the present invention;

FIG. 7 shows a pair of plant supports of the type shown in FIG. 1 nested together;

DETAILED DESCRIPTION OF PREFERRED EMBODIMENTS

Figure 1:
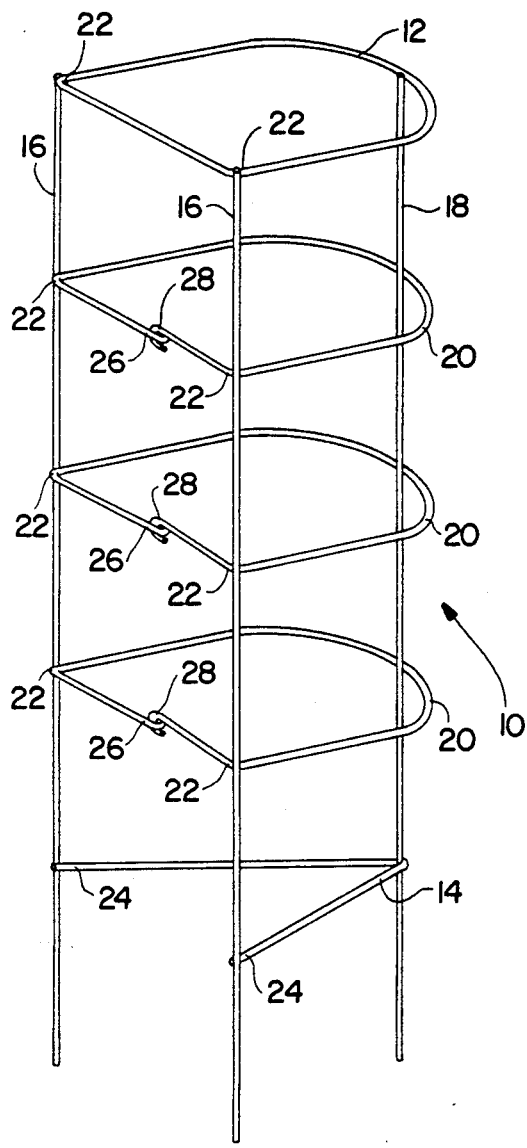
FIG. 1 is a perspective view of an embodiment of the plant support according to the present invention.

An embodiment of the plant support 10 according to the present invention is illustrated in FIG. 1. The plant support 10 is shown constructed of a welded wire structure having a continuous top substantially U-shaped horizontal wire support 12 having a substantially fixed shape and a bottom substantially V-shaped horizontal wire support 14 connected or welded to front vertical wire supports 16,16 on the open side of the wire support and a center vertical wire support 18. Alternatively, the O-shaped top horizontal wire support 12 can be replaced with another differently shaped wire support such as a rectangular shaped one. Located between U-shaped horizontal wire support 12 and V-shaped horizontal wire support 14 are connected discontinuous intermediate U-shaped horizontal wire supports 20,20,20 each having a substantially fixed shape when opened or closed.

The center vertical wire support 18 is connected or welded to the inside inner surfaces of the top U-shaped, intermediate U-shaped and bottom V-shaped wire supports 12,20,20,20,14 at positions within the U-shaped and V-shaped portions, respectively. The front vertical wire supports 16,16 are welded at the outer outside surfaces at or near the corners 22 of the U-shaped wire support 12 and intermediate U-shaped wire supports 20,20,20, and welded at the outside outer surfaces at or near the free ends 24,24 of the V-shaped wire support 14.

The intermediate U-shaped horizontal wire supports 20,20,20 are each provided with a pair of hook end portions 26,28. These hook portions are shown interconnected for operation of the plant support and can be disconnected for nesting purposes (See FIG. 3). These hook end portions are positioned approximately one (1) inch apart after fabrication of the assembly prior to nesting with other plant support assemblies. Such spacing is sufficient to allow side entry of the center vertical wire support 18 when a unit is nested within another unit. The hook end portions are fastened or interconnected together prior to use increasing the rigidity and stability of the assembled unit.

Figure 2:
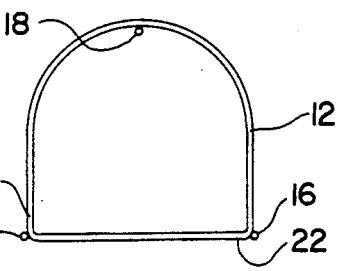
FIG. 2 is a top view of the top horizontal support of the plant support shown in FIG. 1.
Figure 3:
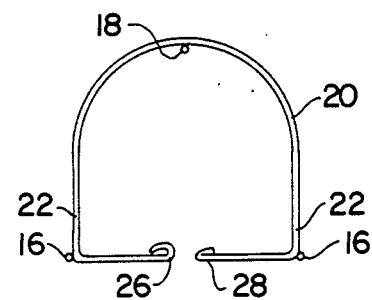
FIG. 3 is a top view of an intermediate horizontal support of the plant support shown in FIG. 1.
Figure 5:
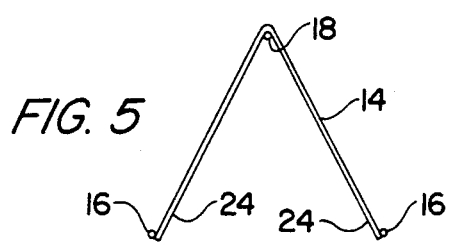
FIG. 5 is a top view of the bottom V-shaped horizontal support in the plant support shown in FIG. 1.

FIG. 2 shows the positioning of the vertical wire supports 16,16,18 when welded to the top horizontal U-shaped wire support 12 with the center vertical wire support 18 being connected to the inside surface and the front vertical wire supports 16,16 being welded on the outside corners 22,22 thereof. FIG. 3 shows the shape of the intermediate U-shaped horizontal supports 20,20,20 having hook end portions 26,28 (disconnected mode). FIG. 5 shows the related positioning of the vertical wire supports 20,20 with respect to the horizontal V-shaped wire support 14. This arrangement of the vertical wire supports relative to the horizontal wire supports allows side loading and nesting of one unit within another unit.

Figure 4:
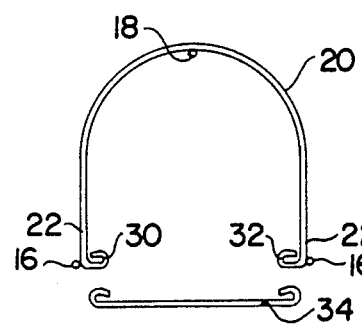
FIG. 4, is a top view of an alternative embodiment of an intermediate horizontal support similar to one of the intermediate horizontal supports in the plant support shown in FIG. 1.

An alternative to providing hook end portions 26,28 on the intermediate horizontal U-shaped wire supports 20,20,20 can be achieved by forming these wire supports in the arrangement shown in FIG. 4. In this embodiment, the intermediate wire supports are provided with hook end portions 30,32 located at or near the corners 22,22 thereof. A separate horizontal cross wire support 34 having hook end portions 36,38 interconnect with hook end portions 30,32 of the intermediate U-shaped wire support 20 in the assembled unit. In an alternative embodiment, the horizontal cross wire support 34 is eliminated and cord, wire, tape or other flexible netting material can be utilized to close the open unit such as by criss-crossing (See FIGS. 6 and 8) for enclosing the plant.

FIG. 6 shows a variation of the embodiment shown in FIG. 1, in which the intermediate horizontal wire supports 20,20,20 having hook end portions 30,32 as shown in FIG. 4, are interconnected both by a plurality of separate horizontal wire supports 34,34,34 and criss-crossing cord, wire or tape as shown in dotted lines in this figure. Alternatively, the wire hook elements may be omitted and such horizontal connections to the front vertical wires can be made by use of the referenced flexible materials used for the diagonal connections shown by the dotted lines.

FIG. 7 shows the nesting of two (2) units the same or similar to that shown in FIG. 1, with a second unit being placed on top of a first unit. In this stacking or nesting arrangement, the top U-shaped horizontal support 12 of the second unit rests on top of and adjacent to the top U-shaped horizontal wire support 12 of the first unit. The length or height of the nested stack of units with hook end portions positioned upwardly will vary according to the length and diameter of the vertical wire supports and the circumference and diameter of the horizontal wire supports. This stacking arrangement provides the minimum space displacement of the stacked units when shipped and stored, and is applicable to all embodiments of the present invention.

Figures 8, 9:
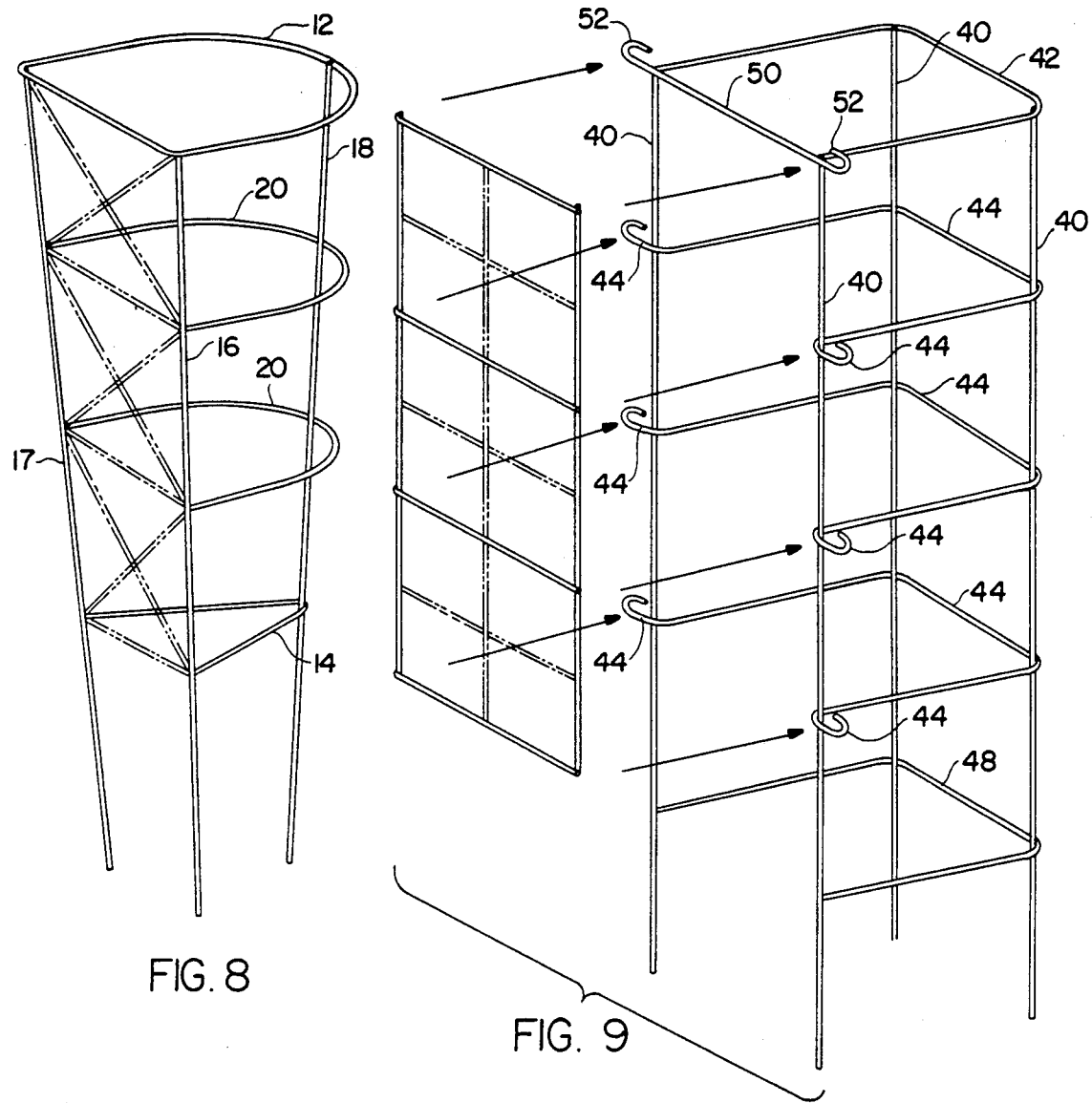
FIG. 8 shows a further embodiment of the plant support according to the present invention in which the vertical supports taper slightly inwardly from top to bottom with a flexible element closing or partially closing the open side of the plant support.
FIG. 9 shows an additional embodiment of the plant support according to the present invention with an entire side removably attached to the plant support.

FIG. 8 shows an alternative to the embodiment shown in FIG. 6, the main difference being the absence of hook end portions on the intermediate horizontal wire supports and the slightly downward tapering of the vertical wire supports 16,16,18. The dotted lines show one possible pattern which can be used for the tying or attaching of cord, wire or tape for supporting the plant's branches on the open side. Alternatively, a separate plastic or wire support or other material such as netting, preferably with extending hook portions or ends attachable to the vertical wire supports could be used to support the plant's branches on the open side. This embodiment is important since it can be fabricated at low cost due to the minimum number of welds required for assembly for both the vertical and horizontal wire supports in combination with the inexpensive nature of the interconnecting cord, tape, etc., applied by the user in various patterns in accordance with the branching characteristics of the plant being supported.

Figures 10, 11, 12:
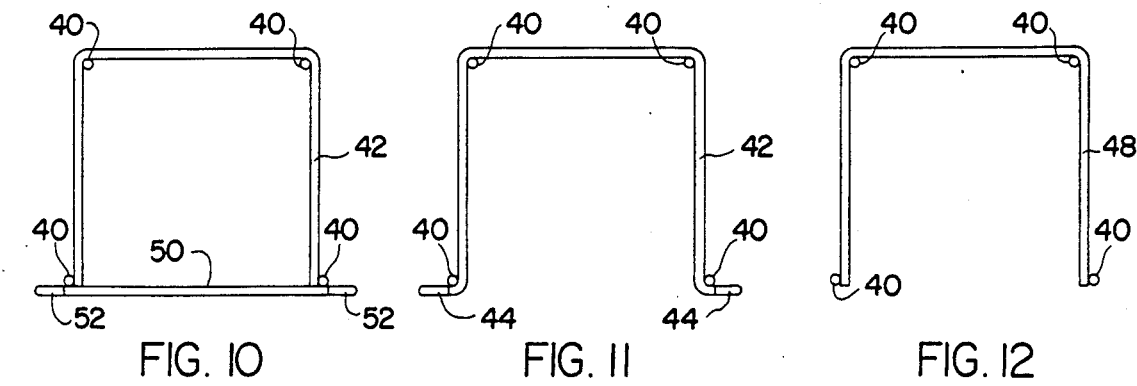
FIG. 10 is a top view of the the top horizontal support of the embodiment of the plant support shown in FIG. 9.
FIG. 11 is a top view of an intermediate horizontal support of the embodiment of the plant support shown in FIG. 9.
FIG. 12 is a top view of the lower horizontal support of the embodiment of the plant support shown in FIG. 9.

FIG. 9 shows another embodiment having four vertical wire supports 40,40,40,40 connected or welded to a top horizontal wire support 42, intermediate horizontal wire supports 44,44,44 with hook end portions 46, and a bottom horizontal wire support 48. As shown in FIGS. 10, 11 and 12, the front vertical supports 40,40 positioned adjacent to the opening to the plant support are located on the outside of the horizontal wire supports 42,44,44,44,48, and the rear vertical wire supports 40,40 are located on the inside of horizontal wire supports 42,44,44,44,48. Further, the top horizontal wire support 42 is constructed of a wire support section 50 having hook end portions 52,52. Alternatively, the hook end portions can be eliminated to reduce the cost of fabrication.

In the embodiment shown in FIG. 9, a plastic or wire fence-like piece 54 or netting can be attached to the above-described structure to form the assembled unit. The fence-like piece or netting can provide support for the plant's branches on the open side. However, such can be replaced with cord, tape, etc. and attached in various patterns in lieu of the fence-like piece, or alternatively or in combination, separate wire support sections having hook end portions can be applied (See FIGS. 4 and 6).

I claim:

1. A plant support, comprising:
    at least three vertical supports each having a top portion and a lower portion acting as a stake for insertion into the ground;
    a continuous top horizontal support having a substantially fixed shape connected to said top portions of said vertical supports; and
    at least one discontinuous horizontal support having an open side and connected to said vertical supports, said discontinuous horizontal support being located below said top horizontal support providing an assembly with an open side and sufficient space to allow side loading and compact nesting of a plurality of plant supports when not in use.

2. A plant support according to claim 1, including means for closing the open side of said plant support.

3. A plant support according to claim 2, wherein said open sided horizontal support is configured to accommodate a separate element for closing said open sided horizontal support.

4. A plant support according to claim 3, wherein both said open sided horizontal support and said separate element include interlocking elements to facilitate closing said open sided horizontal support.

5. A plant support according to claim 4, wherein said interlocking elements are defined by interlocking hook end portions located on both said open sided horizontal support and said separate element.

6. A plant support according to claim 2, wherein said opened sided horizontal support includes attachment means for allowing a flexible member to be attached thereto to close said open sided horizontal support.

7. A plant support according to claim 1, wherein said open sided horizontal support is configured to allow repeated opening and closing of the open side.

8. A plant support according to claim 7, wherein said open sided horizontal support is provided with interlocking elements to allow the repeated opening and closing thereof.

9. A plant support according to claim 8, wherein said interlocking elements comprise of a pair of hooking end portions on said open sided horizontal supports.

10. A plant support according to claim 1, wherein said horizontal supports are partially U-shaped.

11. A plant support according to claim 1, wherein one of said horizontal supports is V-shaped.

12. A plant support according to claim 1, wherein said supports are constructed of wire.

13. A plant support according to claim 1, wherein said plant support is constructed with at least one center vertical support, located opposite to the open side of the plant support, attached to an inner portion of said horizontal supports and a pair of vertical supports are attached to an outer portion of said horizontal supports substantially at the open side of the plant support to facilitate nesting of a plurality of plant supports.

14. A plant support according to claim 1, wherein said vertical supports are tapered slightly inwardly from top to bottom.

15. A plant support according to claim 1, wherein a remaining area on an open side of the plant support may be closed at the time of use by at least one selected from the group of flexible cord, rope, twine, tape or netting or other partitioned fence-like material, attached to said front vertical supports on the open side of the plant support.

16. A plant support, comprising:
    at least three vertical supports each having a top portion and a lower portion acting as a stake for insertion into the ground;

a continuous top horizontal support having a substantially fixed shape connected to said top portions of said vertical supports; and at least one discontinuous horizontal support having an open side and connected to said vertical supports, said discontinuous horizontal support having a substantially fixed shape when opened or closed and being located below said top horizontal support providing an assembly with an open side and sufficient space to allow side loading and compact nesting of a plurality of plant supports when not in use.

17. A plant support according to claim 16, wherein said discontinuous horizontal support is configured in substantially the same shape as said top horizontal support.

18. A plant support according to claim 17, wherein said discontinuous horizontal support is substantially the same size as said top horizontal support.

19. A plant support according to claim 16, including means for closing said discontinuous horizontal support when the plant support is in use.

20. A plant support according to claim 18, including means for closing said discontinuous horizontal support when the plant support is in use.

* * * * *